Aug. 22, 1961  S. NOODLEMAN  2,997,610
ELECTROMAGNETIC BRAKE
Filed Jan. 2, 1957
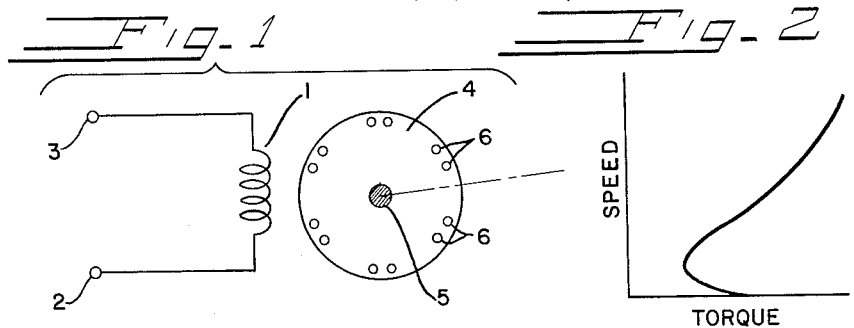
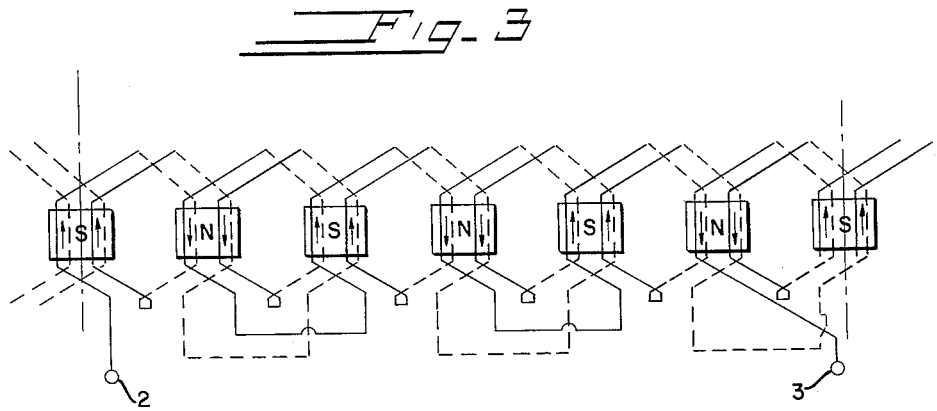
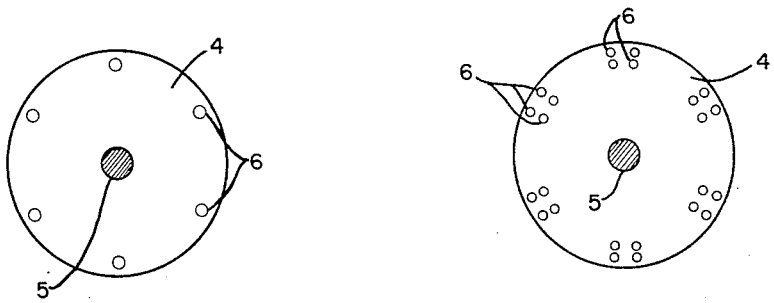
INVENTOR.
SAMUEL NOODLEMAN
BY
DES JARDINS AND ROBINSON
HIS ATTORNEYS

United States Patent Office 2,997,610
Patented Aug. 22, 1961

2,997,610
ELECTROMAGNETIC BRAKE
Samuel Noodleman, Cincinnati, Ohio, assignor to The B. A. Wesche Electric Company, Cincinnati, Ohio, a corporation of Ohio
Filed Jan. 2, 1957, Ser. No. 642,218
5 Claims. (Cl. 310—93)

The invention relates to electromagnetic braking devices and, more particularly, to an electromagnetic braking device for braking angular or rotary movement of a rotatable member.

It is an object of the present invention to provide an electromagnetic braking device of new and improved design.

Another object of the invention is to provide an electromagnetic brake device that is relatively simple to manufacture.

Another object of the invention is to provide an improved device of the character described which provides improved and positive "locking" or "holding" torque when the member to be braked is at rest.

Still another object of the invention is to provide an improved electromagnetic brake which is economical in operation because the electrical losses are minimized.

Other objects and advantages will become apparent to those skilled in the art from the following description of a preferred form or embodiment of the invention, taken in connection with the accompanying drawings in which FIGURE 1 is a schematic view showing a six-pole embodiment of the invention; FIGURE 2 is a graph showing the variation in braking torque as a function of rotational speed; and FIGURE 3 is a schematic view showing a single-phase, six-pole stator winding such as may be employed in accordance with the invention; FIGURE 4 is a schematic view showing a modification of the rotor construction shown in FIGURE 1; and FIGURE 5 shows another modification of the rotor construction.

Briefly stated, in accordance with the one aspect of my invention, I provide a short-circuited conductor, or group of conductors, corresponding to each pole of a single-phase multi-pole stator winding, arranged so that the conductors can orient themselves in a particular way with respect to the electromagnetic field established by the stator winding when the stator winding is energized.

Referring now to FIGURE 1, the device comprises a stator portion (not shown) which is constructed in accordance with well-known principles of alternating current motor or alternator construction and which carries a coil 1. Coil 1 is a single-phase multi-pole winding, which for purposes of illustration has been shown in FIGURE 3 as a whole coil, two-layer winding with two slots per pole. It is to be understood, however, that the type of winding and the number of poles shown herein is by the way of illustration only and not of limitation. Any desired type of multi-pole single-phase winding may be employed and the number of poles provided is a matter of design choice. The ends of coil 1 are connected to terminals 2 and 3 which are adapted to be energized by any suitable source of alternating current single-phase electrical energy.

The rotor portion of the brake comprises a squirrel-cage type of rotor 4. Rotor 4 is adapted to be connected to any type of member which may be subjected to angular or rotational movement. For purposes of illustration, rotor 4 is shown mounted on a rotatable shaft 5. The rotor bars or conductors 6 are grouped as illustrated in FIGURE 1 in a manner and for reasons which will become apparent as description proceeds.

In constructing the rotor, I provide sufficient resistance so that the device will not tend to operate as a single phase motor but will at all times provide braking torque if the rotor is moved and the stator is provided with single-phase power. By providing a single rotor bar, as shown in FIGURE 4, or group of bars, as shown in FIGURE 1 and/or FIGURE 5, corresponding to the number of poles provided by the stator winding 1, the rotor not only provides braking torque upon movement of the rotor but provides "locking" or "holding" torque when the rotor is at rest because the rotor bars 6, since the rotor is free to turn, will orient themselves in such a position that the bars will carry zero or substantially zero current when the rotor is at rest. If the rotor is displaced from such position or for any reason tends to rotate, the rotor bars 6 will carry current in such a direction as to tend to minimize the strength of the combined field provided by the stator winding 1 and the field set up due to the flow of current through the rotor bars 6 and thus produce a torque which tends to oppose rotation of the rotor and to return it to said oriented position.

It will be understood that the physical dimensions of the rotor may make it desirable to provide a greater or lesser number of poles. This may be done in accordance with the invention if the number of rotor bars or bar groupings correspond with the number of poles provided by winding 1. For example, the rotor could be constructed with a single bar for each pole provided in the stator winding such as is shown in FIGURE 4 wherein each of the six bars (corresponding to the number of poles provided in stator winding 1) are spaced 60 mechanical degrees apart. In FIGURE 5 a similar rotor construction is shown except that conductors 6 are arranged in groups of 4, each group being spaced 60 degrees apart. In all illustrations shown, the bars or bar groupings are shown for a six-pole arrangement, it being understood that if a different number of poles are employed in the stator winding 1, the number of bars or bar groupings must be changed to correspond therewith.

By group of bars, I means groups or clusters of bars as shown in FIGURES 1 and 5 wherein the spacing between individual bars may be either in a tangential direction or in a radial direction or both, as shown in FIGURES 1 and 5 respectively. One of the important features of my improved braking device is that zero or substantially zero current is carried by the rotor bars when the rotor is "locked" in the zero speed or oriented position. This is a definite advantage since the rotor bars carry current only when the rotor rotates or is displaced from said oriented position. Thus when the rotor is at rest, the power required for operation is only that required to energize the stator or field winding 1.

Thus it will be seen that I have provided an improved electromagnetic brake which is relatively easy to manufacture, is economical to operate, and which provides improved braking characteristics together with positive "locking" or "holding" torque.

While a particular embodiment of the invention has been illustrated and described it will be obvious that various changes and modifications may be made without departing from the invention and it is intended to cover in the appended claims all such changes and modifications that fall within the true spirit and scope of the invention.

Having thus described my invention, what I claim as new and useful and desire to secure by United States Letters Patent is:

1. In an electromagnetic brake adapted to be energized by alternating current electrical energy, the combination comprising a multipole single-phase stator winding having terminals adapted to be connected to an alternating current source of electrical energy, a squirrel cage rotor having a discrete number of bars spaced apart adjacent the periphery of said rotor, said number and spacing being directly proportional to the number of poles of said stator winding.

2. A brake in accordance with claim 1 wherein said bars are angularly spaced apart by an amount equal to the spacing of said poles.

3. A brake in accordance with claim 1 wherein said bars are angularly spaced apart by an amount equal to the spacing between said stator poles and said number is one bar per pole.

4. A brake in accordance with claim 1 wherein a plurality of rotor bars are arranged in groups and with a discrete number of groups equal to the number of stator poles.

5. A brake in accordance with claim 4 wherein said groups are angularly spaced apart by an amount equal to the spacing of the stator poles and the bars in any group are spaced apart by an amount substantially less than the spacing between adjacent stator poles.

References Cited in the file of this patent

UNITED STATES PATENTS

| | | |
|---|---|---|
| 1,271,401 | Weydell | July 2, 1918 |
| 2,303,638 | Helin | Dec. 1, 1942 |

FOREIGN PATENTS

| | | |
|---|---|---|
| 3,910 | Great Britain | of 1915 |
| 752,009 | Germany | Mar. 23, 1953 |